United States Patent
Han et al.

(10) Patent No.: US 9,726,793 B2
(45) Date of Patent: Aug. 8, 2017

(54) OPEN-TYPE COLOR REFLECTIVE SHEET AND METHOD OF MANUFACTURING THE SAME

(71) Applicants: DAEHAN A&C Co., Ltd., Seoul (KR); Tae Il Kim, Seoul (KR)

(72) Inventors: Chul Dae Han, Seoul (KR); Tae Il Kim, Seoul (KR)

(73) Assignee: DAEHAN A&C CO., LTD. (KR)

( * ) Notice: Subject to any disclaimer, the term of this patent is extended or adjusted under 35 U.S.C. 154(b) by 0 days.

(21) Appl. No.: 15/220,306

(22) Filed: Jul. 26, 2016

(65) Prior Publication Data

US 2017/0075046 A1    Mar. 16, 2017

(30) Foreign Application Priority Data

Sep. 11, 2015  (KR) .................. 10-2015-0128902

(51) Int. Cl.
*G02B 5/128*  (2006.01)
*B05D 5/06*  (2006.01)

(52) U.S. Cl.
CPC .............. *G02B 5/128* (2013.01); *B05D 5/063* (2013.01)

(58) Field of Classification Search
CPC .......... G02B 5/128; G02B 5/136; G02B 1/18; B05D 5/06; C09D 11/101; C09D 5/00

USPC ....... 359/534–543; 156/325, 327, 329, 331.7
See application file for complete search history.

(56) References Cited

U.S. PATENT DOCUMENTS

| | | | |
|---|---|---|---|
| 4,025,674 A | 5/1977 | Mizuochi | |
| 5,812,316 A * | 9/1998 | Ochi | ............. B60R 13/10 359/530 |
| 2003/0053008 A1 | 3/2003 | Nakano | |
| 2003/0156331 A1 | 8/2003 | Oie et al. | |

FOREIGN PATENT DOCUMENTS

| | | | | |
|---|---|---|---|---|
| GB | 2347366 A | 6/2000 | | |
| JP | 2002/333514 | 11/2002 | | |
| JP | 2007/121521 | 5/2007 | | |
| JP | 4728091 B2 * | 7/2011 | ............. | G02B 5/128 |
| KR | 1020110084667 | 7/2011 | | |

* cited by examiner

*Primary Examiner* — James Phan
(74) *Attorney, Agent, or Firm* — Thorpe North & Western, LLP

(57) ABSTRACT

An open-type color reflective sheet and a method of manufacturing the open-type color reflective sheet are provided. The open-type color reflective sheet may include a support layer, a bonding layer laminated on one surface of the support layer and including a binder resin, a pigment and a non-yellowing polyurethane resin, a reflective layer including a plurality of bead-type reflectors embedded in the bonding layer, and a water-repellent coating layer laminated on one surface of the reflective layer, and may selectively include a printed layer formed on the one surface or another.

14 Claims, 6 Drawing Sheets

OPEN-TYPE COLOR REFLECTIVE SHEET AND METHOD OF MANUFACTURING THE SAME

PRIORITY DATA

This application claims the benefit of Korean Patent Application No. 10-2015-0128902, filed on Sep. 11, 2015, in the Korean Intellectual Property Office, the disclosure of which is incorporated herein by reference.

BACKGROUND

1. Field of the Invention

Embodiments relate to a reflective sheet, and more particularly, to an open-type color reflective sheet and a method of manufacturing the open-type color reflective sheet that may represent a variety of colors while maintaining brightness and visibility.

2. Description of the Related Art

Reflective sheets for enhancing visibility by reflecting, for example, specularly reflecting, incident light are widely used. Reflective sheets may facilitate identification of predetermined patterns or characters displayed on reflective sheets. Typically, a reflective sheet is attached to road signs, clothes, shoes or advertisements by an adhesive or sewing. For example, reflective sheets may be attached to clothes of people who work on the road or in dangerous places, such as sanitary workers, fire fighters or construction site workers, and may be used to identify a location of a person wearing a reflective sheet. Accordingly, reflective sheets may be very effective for protection and safety of people who wear the reflective sheets. In addition, when a reflective sheet is used for a road sign, the reflective sheet may reflect light emitted from headlights of a vehicle directly toward a driver during nighttime driving, to enhance recognizability of the road sign.

Reflective sheets are generally classified into cube-corner type reflective sheets and bead-type reflective sheets. Typically, in a cube-corner type reflective sheet, a plurality of prism polyhedrons having a shape of a triangular pyramid are used as reflectors, and in a bead-type reflective sheet, glass beads are used as reflectors. FIG. 1 is a cross-sectional view illustrating a cube-corner type reflective sheet 1 according to a related art.

Referring to FIG. 1, in the cube-corner type reflective sheet 1, an adhesive resin layer 20 is partially formed between a base film 10 and a retroreflector 30, and an isolation space 22 is formed between portions of the adhesive resin layer 20 so that the portions of the adhesive resin layer 20 are bonded through a thermal compression. The retroreflector 30 includes a protective film 32 formed of a thermosetting synthetic resin, a cube-corner layer 34 formed of a thermoplastic synthetic resin, and a cube-corner element 36 processed in a form of a triangular pyramid by performing patterning by pressing the cube-corner layer 34 in a heated mold. The cube-corner element 36 may protrude to increase reflective brightness of the cube-corner type reflective sheet 1 and enhance visibility of the cube-corner type reflective sheet 1. However, because the cube-corner element 36 protrudes to enhance the visibility, an adhesive strength may decrease due to a small contact area to the adhesive resin layer 20, which may allow the base film 10 to be easily peeled off. In addition, due to a penetration of rainwater or foreign substances into a side of the cube-corner type reflective sheet 1, the reflective brightness and the visibility may decrease, and durability of the cube-corner type reflective sheet 1 may also decrease.

A bead-type reflective sheet in Korean Patent Publication No. 10-2011-0084667, published on Jul. 26, 2011 mainly includes, as reflectors, a plurality of transparent microspheres, for example, glasses. In a bead-type reflective sheet using glass beads as reflectors according to the related art, the glass beads and a gray aluminum paste layer used to increase reflectivity of the glass beads are exposed on a surface of the bead-type reflective sheet, to enhance reflective brightness for retroreflection of incident light.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DESCRIPTION OF EMBODIMENTS

Figure 1:
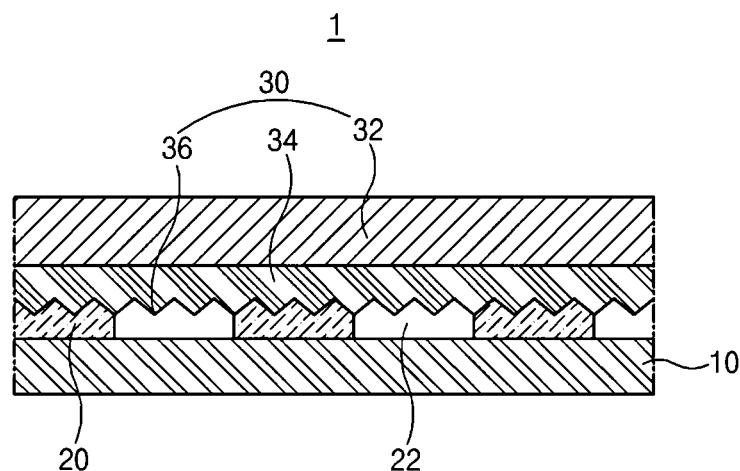
FIG. 1 is a cross-sectional view illustrating a cube-corner type color reflective sheet according to a related art.

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment. The same is true for the term "embodiment."

EXAMPLE EMBODIMENTS

An issue of a decrease in durability and reflective brightness of the bead-type reflective sheet due to a penetration of foreign substances can be problematic. In addition, because only dark grayish colors can be used as background colors due to a characteristic of a glass bead sheet based on an aluminum paste, it is difficult to represent and realize a variety of colors. Because a dark grayish aluminum paste needs to be included in a background, even though a variety of colors are realized, accurate color representation has been limited in the art. For example, dark mustard may be represented because gray and yellow are mixed even though yellow is desired to be represented.

For this reason, use of the bead-type reflective sheet has been limited to, for example, attachment to clothes of people working in dangerous environments where specific colors are of lower importance. There are a large number of limitations, however, in reflective color use for billboards or fashion materials that need to represent and realize colorful and various colors.

A few non-limiting aspects are provided to demonstrate just a few of the qualities and details of various examples of the presently-disclosed reflective sheets. For example, in one aspect an open-type color reflective sheet and a method of manufacturing the open-type color reflective sheet are provided that may prevent a decrease in brightness due to an external environmental factor, for example, a penetration of foreign substances, while maintaining the brightness even under an adverse condition.

Another aspect provides an open-type color reflective sheet and a method of manufacturing the open-type color reflective sheet that may freely realize and represent a variety of colors.

Still another aspect provides an open-type color reflective sheet and a method of manufacturing the open-type color reflective sheet that may prevent, in advance, a decrease in durability due to an external environmental factor.

According to an aspect, there is provided an open-type color reflective sheet including a support layer, a bonding layer laminated on one surface of the support layer, the bonding layer at least including a binder resin, a pigment and a non-yellowing polyurethane resin, a reflective layer including a plurality of bead-type reflectors embedded in the bonding layer, and a silicone-based water-repellent coating layer laminated on one surface of the reflective layer.

An open-type color reflective sheet may further include a printed layer formed in at least one of a position between a bonding layer and a reflective layer or a position between a reflective layer and a silicone-based water-repellent coating layer.

A printed layer may include a one-component ultraviolet (UV) ink containing an adhesive component.

A silicone-based water-repellent coating layer may include a silicone-based water-repellent coating agent selected from a polymer-silica ($SiO_2$), fluoridized nano-silica, a silicone-based one-component waterproof coating agent, or the like, including a combination thereof.

A pigment may include at least one color pigment among a white pigment, a yellow pigment, a red pigment, a blue pigment, a green pigment, a purple pigment and a black pigment, and a fluorescent pigment. Also, the pigment may include other color pigments.

A plurality of bead-type reflectors may be embedded in a bonding layer so that a portion of each of the bead-type reflectors may be exposed by ⅓ to ⅔ of a diameter of each of the bead-type reflectors on one surface of the bonding layer.

A support layer configured to support an open-type color reflective sheet may include a material such as a fiber, paper, leather, a film manufactured from a synthetic resin, or the like, including combinations thereof.

An open-type color reflective sheet may further include a release film layer detachably attached to on an adhesive layer bonded to another surface of a support layer.

According to another aspect, there is provided a method of manufacturing an open-type color reflective sheet, the method including laminating a bonding layer on one surface of a prepared support layer, the bonding layer at least including a binder resin, a pigment and a non-yellowing polyurethane resin, bonding a reflective layer to the bonding layer, the reflective layer including a plurality of bead-type reflectors, and laminating a silicone-based water-repellent coating layer on one surface of the reflective layer.

The method may further include forming a printed layer in at least one of a position between the bonding layer and the reflective layer or a position between the reflective layer and the silicone-based water-repellent coating layer.

The bonding of the reflective layer to the bonding layer may include embedding the plurality of bead-type reflectors in the bonding layer so that a portion of each of the bead-type reflectors is exposed by ⅓ to ⅔ of a diameter of each of the bead-type reflectors on the one surface of the bonding layer.

According to embodiments, in an open-type color reflective sheet, a bonding layer in which various pigments and a binder resin are mixed may be formed on a top surface of a support layer, a silicone-based water-repellent coating layer may be laminated on a top surface of a reflective layer including a plurality of glass beads, and a printed layer may be selectively formed on at least one surface of the reflective layer.

Also, according to various embodiments, a bonding layer in which various pigments and a binder resin are mixed may be formed on a top surface of a support layer configured to support an open-type color reflective sheet, and thus it is possible to realize a variety of colors. In addition, it is possible to form various patterns using a printed layer formed on at least one surface of a reflective layer if necessary.

Furthermore, according to various embodiments, a water-repellent coating layer may be formed on one surface of a reflective layer, and thus it is possible to prevent a decrease in reflective brightness due to an external environmental factor, for example, moisture, rainwater or foreign substances, to maintain good reflective brightness and visibility. Also, it is possible to prevent durability of a reflective sheet from decreasing due to a penetration of foreign substances.

The present inventors have completed the present disclosure as a result of research relating to representing and realizing a variety of colors by solving problems of a reduction in durability, brightness or visibility of a reflective sheet due to an external environmental factor, for example, a penetration of moisture, rainwater or foreign substances. Hereinafter, embodiments will be further described with reference to accompanying drawings.

Open-Type Color Reflective Sheet

Figure 2:
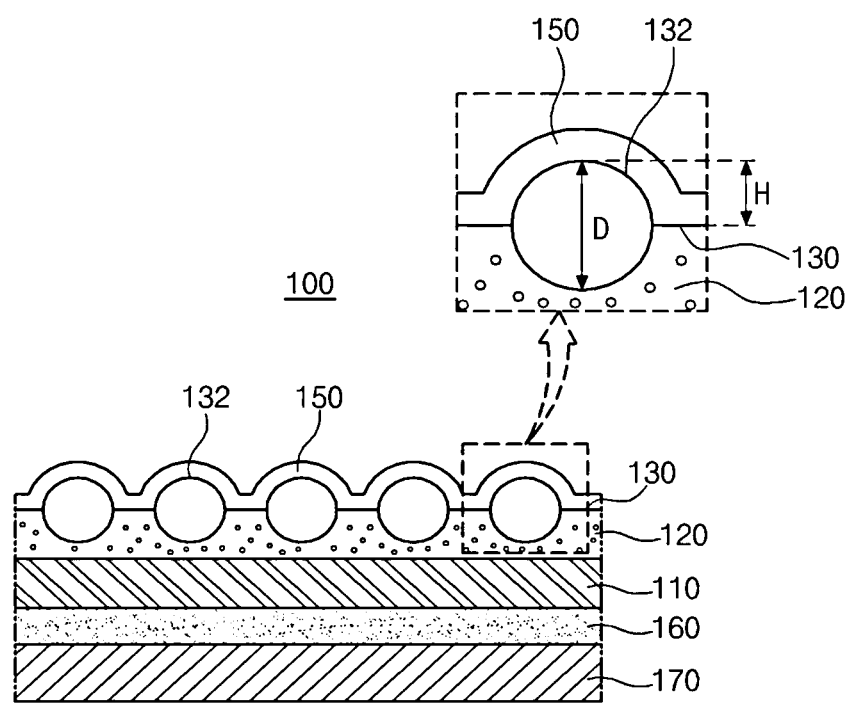
FIG. 2 is a cross-sectional view illustrating an example of an open-type color reflective sheet according to an embodiment.

FIG. 2 is a cross-sectional view illustrating an open-type color reflective sheet 100 according to an embodiment. In the present disclosure, the expression "open-type" is used to refer to a form in which a layer laminated on beads used to reflect light has a curved structure corresponding to the beads so that the beads protrude outwardly, that is, in a direction in which light is incident. Also, in the present disclosure, an upper side and a lower side are referred to as "one surface" and "another surface" based on accompanying cross-section views, however, this is merely an example for convenience of description and the present disclosure is not limited thereto.

Referring to FIG. 2, the open-type color reflective sheet 100 includes a support layer 110, a bonding layer 120, a reflective layer 130, and a water-repellent coating layer 150. The support layer 110 may be configured to support the open-type color reflective sheet 100, and the bonding layer 120 is laminated on one surface of the support layer 110. The reflective layer 130 includes a plurality of bead-type reflectors 132 embedded in one surface of the bonding layer 120, and faces the support layer 110. The water-repellent coating layer 150 is laminated on one surface of the reflective layer 130, and faces the bonding layer 120.

The open-type color reflective sheet 100 may selectively further include a release film layer 170 detachably attached on an adhesive layer 160 bonded to another surface of the support layer 110 opposite to the surface on which the bonding layer 120 is laminated.

For example, the bonding layer 120 and the reflective layer 130 may form a reflective film.

The support layer 110 may support the bonding layer 120 laminated on the one surface of the support layer 110 to realize a variety of background colors of the open-type color reflective sheet 100, may support the reflective layer 130 to reflect light, and may support the water-repellent coating layer 150 to prevent a decrease in visibility. The support layer 110 may be formed of, for example, transparent, semitransparent or opaque materials. Materials used to form the support layer 110 may include, for example, at least one of fiber, paper, leather, and a film manufactured from a synthetic resin or a quantum dot barrier.

Examples of a fiber used to form the support layer 110 may include, but are not limited to, a woven or non-woven selected from cotton, polyester, wool, rayon, lyocell, acetate, nylon, acryl, spandex, polypropylene, vinylon and a combination (for example, a mixed fiber) thereof.

Examples of a mixed fiber used to form the support layer 110 may include, but are not limited to, polyester-cotton (T/C), polyester-rayon (T/R), acryl-polyester (A/T), cotton-nylon (C/N), and cotton-rayon (C/R). Examples of leather used to form the support layer 110 may include, but are not limited to, synthetic leather and natural leather.

Examples of a film used to form the support layer 110 may include, but are not limited to, a synthetic resin film including at least one of a polyester-based resin, a polyolefin-based resin, a polyurethane-based resin, a polyvinyl chloride-based resin, a polyimide-based resin, a polycarbonate-based resin and an acrylic-based resin. For example, as a film used to form the support layer 110, at least one synthetic resin film among polyvinyl chloride (PVC), polyethylene terephthalate (PET), polybutylene terephthalate (PBT), polyethylene naphthalate (PEN), polybutylene naphthalate (PBN), polyurethane (PU), an acrylic resin, polymethyl methacrylate (PMMA), polyethylene (PE), polypropylene (PP), polycarbonate (PC), polyimide (PI), polyester, a melamine resin and an epoxy resin, and a copolymer thereof may be used, however, there is no limitation thereto.

The bonding layer 120 laminated on the one surface of the support layer 110 may be bonded to the reflective layer 130 including the plurality of bead-type reflectors 132. Also, the bonding layer 120 may be configured to realize a variety of background colors for the open-type color reflective sheet 100. To this end, the bonding layer 120 may at least include a binder resin, a non-yellowing polyurethane resin and a pigment, and may further include nano-pearl particles.

As the binder resin included in the bonding layer 120, an arbitrary binder resin having binding power to embed a portion of a bead-type reflector 132 in the bonding layer 120 and to fix and support the bead-type reflector 132 may be used. The binder resin in the bonding layer 120 may be, for example, a binder resin to strongly bind pigments and particles, for example, nano-pearl particles. For example, the binder resin may be either a natural resin or a synthetic resin or both. The synthetic resin may include, for example, an acrylic-based resin, a urethane-based resin, a silicone-based resin, an epoxy-based resin, a polyvinyl chloride-based resin, a polyethylene-based resin, and a polyester-based resin. For example, an acrylic-based binder resin may be used to stably fix the bead-type reflectors 132.

To realize a background color of a reflective sheet according to a related art, metal particles, for example, aluminum (Al), nickel (Ni), zinc (Zn) or tin (Sn), were used in a form of a paste to an adhesive to increase reflectivity. However, because only a grayish background color may be realized due to characteristics of the metal particles using the above scheme, the scheme has a limitation to realizing of a variety of colors. Because a dark grayish aluminum paste needs to be included in a background even though a variety of colors are realized, accurate color representation has been limited. For example, a dark mustard color, instead of yellow, may be represented as a final color because gray and yellow are mixed.

According to the related art, a reflective sheet attached to clothing of people working in dangerous places has been used for only safety, and has a limitation for use in billboards or fashion materials requiring a variety of background colors. According to embodiments, pigments may be mixed to realize a variety of colors in the bonding layer 120. Sizes of color pigments and/or fluorescent pigments to be mixed in the bonding layer 120 are not particularly limited. For example, color pigments and/or fluorescent pigments may have an average size equal to or less than 2.0 micrometers (μm), or in another example, from 0.01 μm to 2.0 μm.

As a pigment mixed with the binder resin to realize a variety of colors in the bonding layer 120, a white pigment, a yellow pigment, a red pigment, a blue pigment, a green pigment, a purple pigment, a black pigment and/or a fluorescent pigment may be used. By properly mixing pigments, a variety of background colors may be realized, and colors of an all-over continuous pattern may also be realized. For example, the white pigment may include, but is not limited to, a titanium dioxide ($TiO_2$)-based pigment, a zinc oxide (ZnO)-based pigment, a zinc sulfide (ZnS)-based pigment, a lithopone-based pigment that is a mixture of ZnS and barium sulfate ($BaSO_4$), lead white that is a basic lead carbonate, and diantimony trioxide ($Sb_2O_3$)-based pigment.

Examples of the yellow pigment may include, but are not limited to, chrome yellow (lead chromate), zinc chromate, cadmium yellow that contains cadmium sulfide (CdS) as a primary component, lead cyanamide that contains lead(II) cyanide ($Pb(CN)_2$) as a primary component, titanium yellow (titanium nickel yellow) formed of titanium dioxide ($TiO_2$), nickel oxide (NiO) and antimony trioxide ($Sb_2O_3$), and strontium chromate ($SrCrO_4$).

Examples of the red pigment may include, but are not limited to, iron oxide red that contains ferric oxide ($Fe_2O_3$) as a primary component, red lead that contains lead tetroxide ($PbO_4$) as a primary component, cuprous oxide, also called red copper oxide, that contains copper peroxide ($CuO_2$) as a primary component, vermilion that contains mercury sulfide (HgS) as a primary component, and cadmium red, also called selenium red, including a mixed crystal of CdS and HgS.

Examples of the blue pigment may include, but are not limited to, Prussian blue, also called milori blue or iron blue, that contains $Fe_2(CN)_6$ as a primary component, ultramarine blue, and cobalt blue that contains cobalt aluminate as a primary component.

Examples of the green pigment may include, but are not limited to, an inorganic pigment, such as chrome green, chromate oxide green that contains chromium(III) oxide ($Cr_2O_3$) as a primary component, viridian that contains hydrated chromium(III) oxide ($Cr_2O(OH)_4$) as a primary component, zinc green that is a mixture of $ZrCrO_4$ and Prussian blue, cobalt green ($Cr_2O_3$—$Al_2O_3$—CoO) and cyanine blue, or an organic pigment, such as phthalocyanine.

Examples of the purple pigment may include, but are not limited to, manganese violet (mineral violet) that contains ammonium manganese(III) pyrophosphate ($NH_4MnP_2O_7$) as a primary component, and cobalt violet deep that contains cobalt(II) phosphate ($Co_3(PO_4)_2$) as a primary component.

Examples of the black pigment may include, but are not limited to, carbon black, graphite, and iron(II,III) oxide ($Fe_3O_4$).

The fluorescent pigment may include, for example, a crystal manufactured by adding an extremely small amount of metal (for example, Cu, Ag, Bi, or Pb) as an activator to an inorganic fluorescent material, such as zinc sulfide (ZnS), a heavy metal salt, such as zinc cadmium sulfide (ZnCdS) or calcium strontium sulfide (CaSrS), or a sulfide of alkaline-earth metal, such as calcium sulfide (CaS). Examples of the fluorescent pigment may include, but are not limited to, CaS/Bi (blue), CaSrS/Bi (light blue), ZnS/Cu (green), ZnCdS/Cu (yellow), ZnS/Mn (yellow), ZnCdS/Cu (orange), ZnS/Ag (purple), ZnCdS/Cu (red-orange) and ZnS/Bi (red).

Color pigments, for example, the white pigment, the yellow pigment, the red pigment, the blue pigment, the green pigment, the purple pigment and the black pigment mixed in the bonding layer 120 may be used alone or may be properly mixed together, to realize a desired background color. The color pigments may desirably have a non-yellowing property. Using a color pigment having a non-yellowing property, it is possible to prevent visibility of a background color from being reduced due to decoloration.

In addition, the bonding layer 120 may include a non-yellowing polyurethane resin to enhance visibility of the open-type color reflective sheet 100 by preventing the bead-type reflectors 132 from being detached from the reflective layer 130 bonded to one surface of the bonding layer 120 and maintaining a stable color. For example, the non-yellowing polyurethane resin may be good in impact resistance, wear resistance and chemical resistance due to a high elastic property. In particular, because the non-yellowing polyurethane resin is excellent in resistance to moisture or salinity after curing, a problem of a decrease in durability or brightness of the open-type color reflective sheet 100 due to a penetration of rainwater, moisture or foreign substances may be solved.

For example, the non-yellowing polyurethane resin mixed in the bonding layer 120 may be synthesized from a compound with an isocyanate and a polyol. A polyol used to synthesize the non-yellowing polyurethane resin may include, for example, a polyester-based polyol, a hydrocarbon-based polyol, a polycarbonate-based polyol and a lactone-based polyester polyol. The polyester-based polyol may include, for example, a polyester-based polyol obtained by synthesizing diols, for example, an aliphatic acid, such as an adipic acid, a to glutaric acid and azelaic acid, a dicarboxylic acid selected from aromatic acids, such as a phthalic acid, terephthalic acid and naphthenic acid, glycol, such as ethylene glycol, diethylene glycol and 1,6-hexaethylene glycol, polyhydric alcohols, such as glycerol, trimethylolpropane and pentaerythritol.

An isocyanate compound may include, for example, an aromatic or aliphatic, or a saturated or unsaturated isocyanate compound. Examples of the isocyanate compound may include, but are not limited to, at least one of 4,4'-diphenylmethane diisocyanate (MDI), xylene diisocyanate, isophorone diisocyanate (IPDI) and cyclohexane diisocyanate (CHDI).

When the non-yellowing polyurethane resin is synthesized, a molar ratio (NCO/OH) of an isocyanate group (—NCO) of the isocyanate compound and a hydroxyl group (—OH) of the polyol and may be properly adjusted, and a ratio of a hard segment and a soft segment may be controlled. For example, in the synthesized non-yellowing polyurethane resin, the hard segment is contained in an amount of 5% by weight (wt %) to 40 wt %, and the molar ratio (NCO/OH) may be in a range of about 1.3 to 3.5. For example, when the hard segment content is less than 5 wt %, an effect of preventing the bead-type reflectors 132 from being detached from the bonding layer 120 may be small. When the hard segment content exceeds 40 wt %, a contact area to the bead-type reflectors 132 may decrease due to excessive viscoelasticity and adhesion properties may decrease.

Polyurethane may be synthesized through a reaction of a polyol and an isocyanate compound using a catalyst such as amine and/or metal. An appropriate chain extender may be selectively used, if necessary, and may include, for example, a low-molecular weight amine, such as diethanolamine, 1,4-butylenediamine and 1,6-hexamethylenediamine, or crosslinking low-molecular weight compound that is a hydroxyl compound, such as ethylene glycol, butanediol, 1,6-hexanediol and 1,4-cyclohexanediol. Typically, 1.5 to 20 parts by weight of a chain extender may be added for 100 parts by weight of the polyol. Non-yellowing polyurethane may be aqueous or oily, and a solid content in the non-yellowing polyurethane may be, but is not limited to, in a range of about 20 wt % to 50 wt %.

The bonding layer 120 may further include nano-pearl particles that have nano-molecular sizes and that are added and mixed with the binder resin, the pigment and the non-yellowing polyurethane resin described above. When the nano-pearl particles are mixed, a reflective efficiency of light incident on the open-type color reflective sheet 100 may be further enhanced. The nano-pearl particles may be formed of materials, for example, natural pearl essence, such as a mixed crystal of guanine and hypoxanthine, and synthetic pearl particles selected from metal-oxide film mica-based particles, basic lead carbonate-based particles, and bismuth oxychloride-based particles.

Metal-oxide film mica-based particles may include, for example, a titanium dioxide-coated mica obtained by applying a small piece of a white mica, iron oxide-coated mica, a bismuth oxychloride-coated mica, and a titanium dioxide-coated mica having a surface coated with the above-described color pigment. By using nano-pearl particles having a non-yellowing property, it is possible to enhance the visibility by realizing a clear color despite decoloration.

Contents of the above components in the bonding layer 120 are not particularly limited, and for example, 80 to 120 parts by weight of the binder resin, 5 to 20 parts by weight of the pigment, 40 to 80 parts by weight of the non-yellowing polyurethane resin, and 1 to 10 parts by weight of the nano-pearl particles may be mixed at a relative ratio.

The reflective layer 130 is bonded and laminated onto one surface of the bonding layer 120 opposite to the one surface of the support layer 110 to which the bonding layer 120 is bonded. The plurality of bead-type reflectors 132 are arranged on the reflective layer 130. The bead-type reflectors 132 may include, for example, arbitrary beads having a proper photorefractive index to retroreflect light incident on the open-type color reflective sheet 100.

A bead-type reflector 132 may be a transparent bead, and may be appropriately selected from, for example, a glass bead, and a transparent synthetic resin-based bead such as a non-glass ceramic bead or an acrylic-based bead. For example, a glass bead having a high refractive index may be used as a bead-type reflector 132. The bead-type reflector 132 may have a globular cross section or an oval cross section, and may desirably have a globular cross section for a uniform reflective efficiency. A size of the bead-type reflector 132 is not particularly limited, and may be determined based on use or purpose of an adherend to which the open-type color reflective sheet 100 is applied. For example, the bead-type reflector 132 may have a diameter D of 1.0 µm to 2.0 millimeter (mm), a diameter D of 10 µm to 1.0 mm, a diameter D of 20 µm to 50 µm, or a diameter D of 28 µm to 40 µm; however, the size of the bead-type reflector 132 is not limited thereto.

The bead-type reflector 132 may be embedded in the bonding layer 120 to protrude toward one surface of the bonding layer 120, that is, toward a surface on which light is incident. For example, a portion of the bead-type reflector 132 may be embedded in the bonding layer 120, and the other portion may protrude toward the one surface of the bonding layer 120, that is, from the surface on which light is incident. For example, the bead-type reflector 132 may protrude by ⅓ to ⅔ of the diameter D. Also, a protrusion height H of the protruding portion of the bead-type reflector 132 may correspond to a range from about ⅓ to ⅔ of the diameter D of the bead-type reflector 132.

In an example, when the protrusion height H of the bead-type reflector 132 is within the above range, the bead-type reflector 132 may be strongly embedded in and supported by the bonding layer 120 with a good reflective brightness. In another example, when the protrusion height H of the bead-type reflector 132 is less than ⅓ of the diameter D, the bead-type reflector 132 may be excessively embedded in the bonding layer 120, and accordingly a refractive index of the bead-type reflector 132 may decrease. Thus, it may be difficult to secure a good reflective brightness.

In still another example, when the protrusion height H of the bead-type reflector 132 exceeds ⅔ of the diameter D, binding power of the bead-type reflector 132 to the bonding layer 120 may decrease, and accordingly the bead-type reflector 132 may be detached from the bonding layer 120 instead of being securely embedded in the bonding layer 120. In other words, a portion of the bead-type reflector 132 corresponding to about one half of the diameter D may be embedded in the bonding layer 120, and the other portion may protrude from a surface of the bonding layer 120.

The water-repellent coating layer 150 is laminated on one surface of the reflective layer 130 opposite to the bonding layer 120, to form a surface of the open-type color reflective sheet 100. Because a reflective sheet according to a related art has focused on only securing of a good brightness, prevention of a penetration of a water-based component, such as moisture or rainwater, or other foreign substances fails. When an external environmental factor, for example, moisture, rainwater or foreign substances, penetrates into the reflective sheet, a refractive index of a reflector may decrease, and a reflective efficiency may also decrease, which may cause the brightness to be reduced. Also, durability of the reflective sheet due to a penetration of foreign substances may decrease. However, in the related art, the above chronic problems have not been solved. In the open-type color reflective sheet 100, the water-repellent coating layer 150 may be formed to prevent foreign substances as well as a water-based component, such as moisture or rainwater, from penetrating into the surface of the open-type color reflective sheet 100.

For example, the water-repellent coating layer 150 may be manufactured from a silicone-based water-repellent coating agent. The silicone-based water-repellent coating agent may orient a methyl group (—$CH_3$) having a low critical surface tension, may be inexpensive, and in particular may be advantageous to prevent a penetration of an chloride ion. Examples of the silicone-based water-repellent coating agent forming the water-repellent coating layer 150 may include, but are not limited to, polymer-silica ($SiO_2$), fluoridized nano-silica, a silicone-based one-component waterproof coating agent and a combination thereof. The fluoridized nano-silica may orient a trifluoromethyl group (—$CF_3$) and a difluoromethyl group (—$CF_2$—) due to fluorine, and accordingly it is advantageous to maximize water-repellent properties. A water-repellent agent forming the water-repellent coating layer 150 may include, for example, an isocyanate curing silicone-acrylic copolymer, an acrylic-silicone resin, an organosilicon waterproof coating agent, however, embodiments are not limited thereto. The isocyanate curing silicone-acrylic copolymer may be obtained by performing radical polymerization on an acrylic monomer using a polymer-silica derivative, for example, polydimethoxy siloxane and a silicone polymer initiator having an azo group.

The open-type color reflective sheet 100 may selectively further include the release film layer 170 detachably formed on the adhesive layer 160 attached to the other surface of the support layer 110. As described above, on the one surface of the support layer 110, the bonding layer 120, the reflective layer 130 and the water-repellent coating layer 150 are sequentially laminated and formed.

The adhesive layer 160 may be used to attach the open-type color reflective sheet 100 to an adherend, for example, a billboard, a road sign or clothes worn on a person (for example, a fire fighter, a police officer or a street cleaner) who performs a dangerous job. In particular, the adhesive layer 160 may be very effectively used as materials for advertising, clothes, bags or accessories used in fashion.

For example, the adhesive layer 160 may be thermal-bonded to the adherend using a high-temperature pressing scheme or a high frequency scheme. The adhesive layer 160 may use an arbitrary adhesive having adhesion between the support layer 110 and the release film layer 170. The adhesive used in the adhesive layer 160 may include, for example, a removable type adhesive removable from the other surface of the support layer 110, a permanent type adhesive completely attached to the other surface of the support layer 110, or a hot-melt type adhesive.

For example, when the adherend is clothing, a hot-melt type adhesive having good elasticity and flexibility may be used based on characteristics of textile products such as clothes and keeping of an original form after washing. When the adhesive layer 160 is attached to the adherend through thermal fusion bonding, an adhesive having a low melting point may be desirably used. For example, a polyolefin-based adhesive, such as polyethylene (PE) and polypropylene (PP), or ethylene-vinyl acetate (EVA)-based low-melting point adhesive may be used.

Examples of the adhesive may include, but are not limited to, a natural resin and/or a synthetic resin. For example, the adhesive may include, but is not limited to, at least one of a polyethylene-based adhesive, such as low-density polyethylene (LDPE), a polyurethane-based adhesive formed by a reaction of a polyol and isocyanate, a polyester-based adhesive, an acrylic-based adhesive, an epoxy-based adhesive, an EVA-based adhesive and a polyvinyl chloride (PVC)-based adhesive. Depending on circumstances, the adhesive layer 160 may be applied directly onto the bonding layer 120.

The release film layer 170 may be peeled off and removed from the adhesive layer 160 to attach the adhesive layer 160 to the adherend when the open-type color reflective sheet 100 is attached to the adherend. To this end, release processing may be performed using a scheme of forming a release layer coated with a silicone composition on one surface of the release film layer 170. The release film layer 170 may be formed of, for example, paper materials, synthetic resin materials and fiber materials.

A synthetic resin used to form the release film layer 170 may include, for example, one of a polyester-based resin, a polyolefin-based resin, a polyurethane-based resin, a polyimide-based resin, an acrylic-based resin and a combination thereof. Synthetic resin materials used to form the release film layer 170 may include, for example, at least one synthetic resin among polyethylene terephthalate (PET), polybutylene terephthalate (PBT), polyethylene naphthalate (PEN), polybutylene naphthalate (PBN), polyethylene (PE), polypropylene (PP), polyurethane (PU), polyvinyl chloride (PVC), polyimide (PI), polycarbonate (PC), polyacryl (PA), ethylene-vinyl acetate (EVA), and a copolymer thereof, however, there is no limitation thereto. Examples of a fiber used to form the release film layer 170 may include, but are not limited to, a woven or non-woven formed of cotton, polyester, nylon, rayon and a mixed fiber thereof.

As described above, the open-type color reflective sheet 100 may prevent a decrease in the reflective brightness and durability due to an external environmental factor, and may realize a variety of background colors instead of dark gray.

Figure 3:
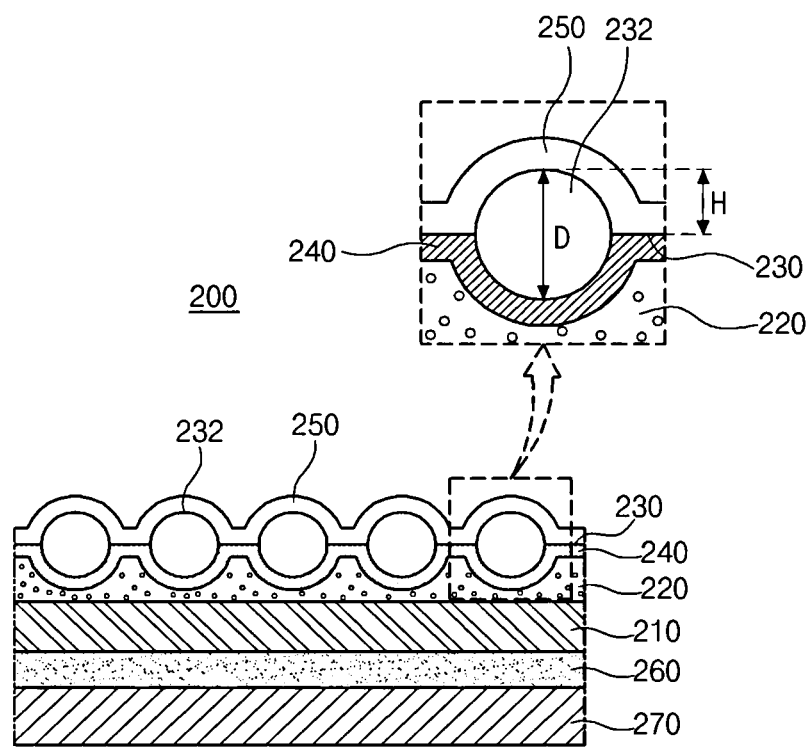
FIG. 3 is a cross-sectional view illustrating another example of an open-type color reflective sheet according to an embodiment.

In an example, the open-type color reflective sheet 100 may further include a printed layer to enable a variety of colors or patterns to be realized on one surface of the bonding layer 120 formed to realize a variety of background colors. FIG. 3 is a cross-sectional view illustrating an open-type color reflective sheet 200 according to an embodiment. In the open-type color reflective sheet 200, a printed layer 240 is formed on a bottom surface of a reflective layer 230, that is, between the reflective layer 230 and a bonding layer 220.

Referring to FIG. 3, the open-type color reflective sheet 200 includes a support layer 210, the bonding layer 220, the reflective layer 230, the printed layer 240, and a water-repellent coating layer 250. The bonding layer 220 is laminated and bonded to one surface of the support layer 210, and the printed layer 240 is laminated on one surface of the bonding layer 220. The reflective layer 230 includes a plurality of bead-type reflectors 232 embedded in the one surface of the bonding layer 220 through the printed layer 240. The water-repellent coating layer 250 is laminated on one surface of the reflective layer 230. The open-type color reflective sheet 200 selectively includes a release film layer 270 detachably attached to an adhesive layer 260 applied onto another surface of the support layer 210.

The support layer 210, the bonding layer 220, the reflective layer 230, the water-repellent coating layer 250, the adhesive layer 260 and the release film layer 270 in the open-type color reflective sheet 200 have substantially the same configurations as the support layer 110, the bonding layer 120, the reflective layer 130, the water-repellent coating layer 150, the adhesive layer 160 and the release film layer 170 in the open-type color reflective sheet 100 of FIG. 2, respectively, and accordingly further description thereof is not repeated here.

In the open-type color reflective sheet 200, the printed layer 240 on which a character and/or a pattern such as an all-over continuous pattern are printed is formed between the one surface of the bonding layer 220 and another surface of the reflective layer 230 including the plurality of bead-type reflectors 232. The bonding layer 220 is formed by mixing a binder resin, a plurality of pigments, a non-yellowing polyethylene resin and nano-pearl particles, and is laminated on a top surface of the support layer 210.

For example, the printed layer 240 may form an all-over continuous pattern using appropriate ink. As ink included in the printed layer 240 to form an all-over continuous pattern, one-component ultraviolet (UV) curable ink containing an adhesive component may be used. Because when UV curable ink is used, curing of ink may be performed for a relatively short period of time, colors of various patterns or desired characters may be more clearly printed, and four primary colors may be easily printed. Thus, it is advantageous to freely represent colors.

For example, ink may include an adhesive base resin, an ink primer and a solvent. Examples of an adhesive base resin used to form the printed layer 240 may include, but are not limited to, at least one binder resin among a silicone-based resin, a polyurethane (PU)-based resin, a melamine-based resin, a polyvinyl chloride (PVC)-based resin, a polyvinyl alcohol (PVA)-based resin, and an acrylic-based resin. For example, a one-component UV curable binder resin may be used as the adhesive base resin. In this example, one-component UV ink including a base resin that is an adhesive component may to be used as ink to form a pattern on the printed layer 240.

The ink primer may allow the ink to be properly fixed onto the printed layer 240. For example, the ink primer may include a proper pigment used to realize a variety of colors, a wetting agent used to induce pigments to quickly spread, and a surfactant used to enhance interface properties of a pattern printed by the ink primer. The ink primer may further include an inorganic filler, if necessary. For example, 0.1 to 50 parts by weight of the ink primer may be mixed for 100 parts by weight of the adhesive binder resin forming ink used to form a pattern on the printed layer 240.

Colors of the pigment included in the ink primer are not particularly limited. For example, the pigment may at least include typical four primary colors, that is, cyan (C), magenta (M), yellow (Y) and black (K). Also, the pigment may further include other dyes or color.

Examples of the wetting agent in the ink primer may include, but are not limited to, at least one of diols, such as 1,3-butanediol, 1,4-butanediol, 1-5-pentandiol, 2-butene-1, 4-diol and 2-methyl-2-pentandiol, and/or glycols, such as glycerine, ethylene glycol, diethylene glycol, triethylene glycol, propylene glycol, dipropylene glycol and hexylene glycol. For example, 0.05 to 30 parts by weight of the wetting agent may be contained based on 100 parts by weight of the adhesive binder resin.

Examples of the surfactant in the ink primer may include, but are not limited to, at least one of polyoxyethylene alkyl ether, polyoxyethylene alkyl phenyl ether, polyglycerin fatty acid ester and sorbitan fatty acid ester.

For example, 0.05 to 20 parts by weight of the surfactant may be contained for 100 parts by weight of the adhesive base resin. By adjusting contents of the wetting agent and the surfactant in the ink primer in the above ranges, a pattern printed using the ink may be fixed on the printed layer 240 in an optimum state without a change in the reflective brightness from the bead-type reflectors 232 of the reflective layer 230.

The ink primer may selectively further include an inorganic filler. The inorganic filler of the ink primer may include, for example, at least one of silica, clay, talc, diatomite, zeolite, calcium carbonate, alumina, zinc oxide, and titanium dioxide, however, embodiments are not limited thereto. For example, 0.1 to 10 parts by weight of the inorganic filler may be contained in the ink primer for 100 parts by weight of the adhesive base resin. The inorganic filler may have, for example, an average size equal to or less than 2.0 μm, or in another example, from 0.01 μm to 2.0 μm.

Examples of the solvent in the ink primer may include, but is not limited to, at least one of water, ethanol, butanol, phentanol, methyl ethyl ketone (MEK) and toluene. For example, 30 to 150 parts by weight of the solvent may be contained for 100 parts by weight of the adhesive base resin.

The ink may selectively further include a viscosity controlling agent, for example, carboxyl cellulose. Also, the ink may further include other additive components that may be typically used if necessary.

In comparison to the open-type color reflective sheet 100, the plurality of bead-type reflectors 232 included in the reflective layer 230 may be embedded in the printed layer 240 so that a portion of each of the bead-type reflectors 232 may be exposed by a protrusion height H corresponding to ⅓ to ⅔ of a diameter D of each of the bead-type reflectors 232 on one surface of the printed layer 240. When the bead-type reflectors 232 are embedded in one surface of the printed layer 240, the printed layer 240 may have a curved structure corresponding to protrusion of the bead-type reflectors 232. Accordingly, it is possible to prevent a reduction in visibility of a plurality of all-over continuous patterns represented on the printed layer 240.

The printed layer 240 is formed on a bottom surface of the reflective layer 230 as shown in FIG. 3, however, there is no limitation thereto. For example, the printed layer 240 may be formed on a top surface of the reflective layer 230, that is, in a direction of incident light.

Figure 4:
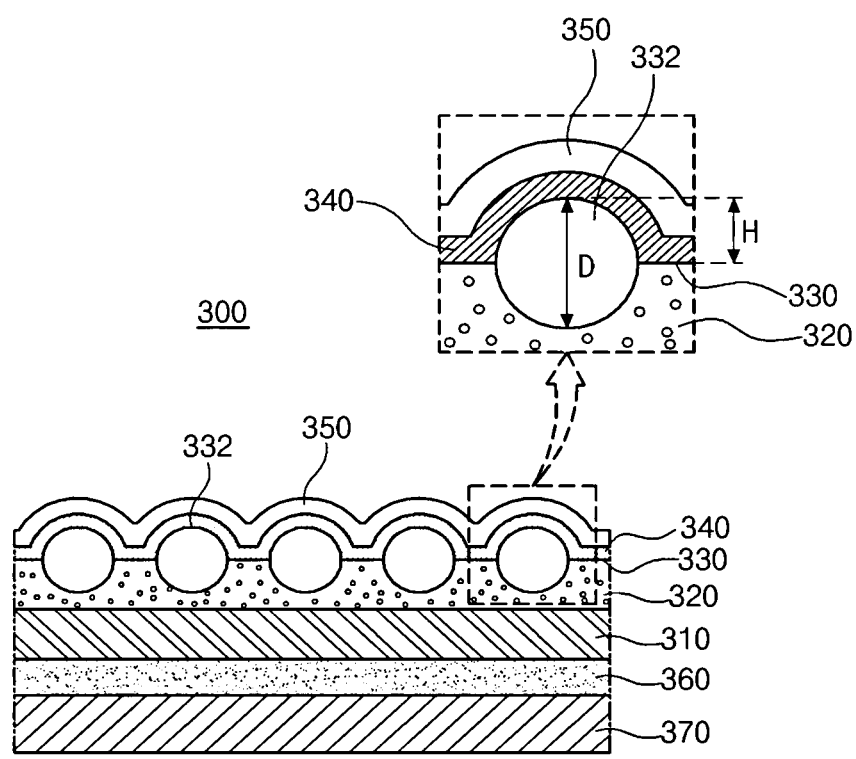
FIG. 4 is a cross-sectional view illustrating still another example of an open-type color reflective sheet according to an embodiment.

FIG. 4 is a cross-sectional view illustrating an open-type color reflective sheet 300 according to an embodiment. Referring to FIG. 4, the open-type color reflective sheet 300 includes a support layer 310, a bonding layer 320, a reflective layer 330, a printed layer 340, and a water-repellent coating layer 350. The bonding layer 320 is laminated on one surface of the support layer 210. The reflective layer 330 includes a plurality of bead-type reflectors 332 embedded in one surface of the bonding layer 320, and is bonded to the bonding layer 320. The printed layer 340 is formed on a top surface of the reflective layer 330, and the water-repellent coating layer 350 is applied onto a top surface of the printed layer 340. The open-type color reflective sheet 300 selectively includes a release film layer 370 detachably formed on an adhesive layer 360 applied onto another surface of the support layer 310.

In comparison to the open-type color reflective sheet 200 of FIG. 3, the printed layer 340 of the open-type color reflective sheet 300 on which various all-over continuous patterns are printed are printed is formed on the reflective layer 330. The printed layer 340 is formed on protruding portions of the bead-type reflectors 332 in a direction in which light is incident on the reflective layer 330 including the bead-type reflectors 332. Due to a curved surface structure corresponding to the protruding portions of the bead-type reflectors 332, reflective brightness may not be reduced even though the printed layer 340 is formed on the reflective layer 330. In addition, an image or a pattern, such as a all-over continuous pattern, formed on the printed layer 340 may have good visibility, and thus it is possible to easily identify the image or pattern even at a long distance.

For example, when a pattern, such as an all-over continuous pattern, or characters with a variety of colors are formed on the printed layer 240, 340 formed on a top surface or a bottom surface of the reflective layer 230, 330, as shown in FIGS. 3 and 4, two-layered colors may be applied based on a direction in which the pattern or characters are viewed due to crossing with a variety of colors of the bonding layer 220, 320 in which various organic pigments and/or fluorescent pigments are mixed. Thus, it is advantageous to provide a three-dimensional (3D) texture. In another example, printed layers may be formed both between the bonding layer 220, 320 and the reflective layer 230, 330 and between the reflective layer 230, 330 and the water-repellent coating layer 250, 350. In this example, three-layered colors may be applied, and thus it is possible to provide more 3D and various textures.

In the open-type color reflective sheet 100, 200, 300, the printed layer 340 and the water-repellent coating layer 150, 250, 350 laminated on the reflective layer 130, 230, 330 are formed with a curved structure corresponding to the bead-type reflector 132, 232, 332. Also, because a surface of the open-type color reflective sheet 100, 200, 300 on which light is incident has a curved structure similarly to the bead-type reflector 132, 232, 332, the open-type color reflective sheet 100, 200, 300 may have excellent reflective brightness, and may secure high visibility for the printed layer 340. Thus, it is possible to easily identify an image formed on the printed layer 340.

Method of Manufacturing Open-Type Color Reflective Sheet

Hereinafter, a process of manufacturing an open-type color reflective sheet according to an embodiment will be described with reference to FIG. 5.

Figure 5:
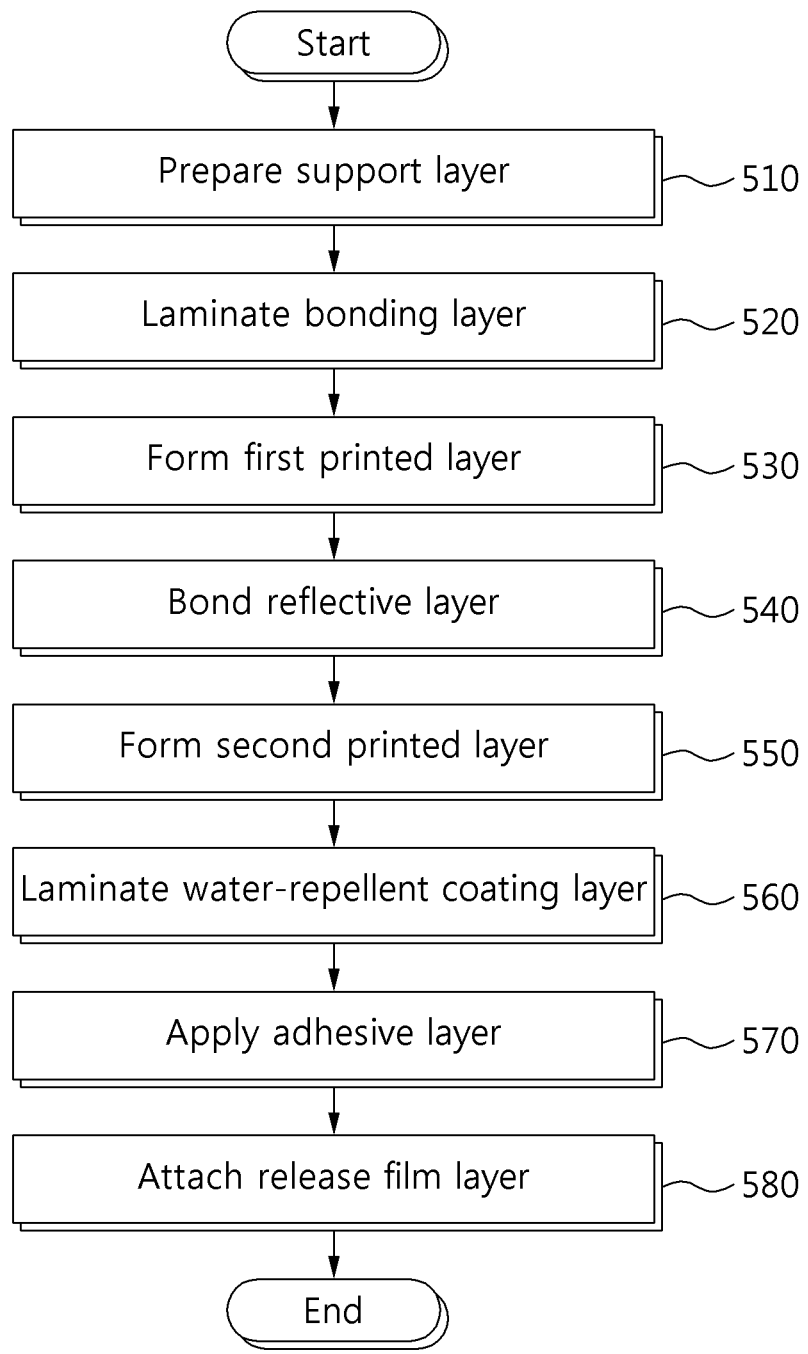
FIG. 5 is a flowchart illustrating a process of manufacturing an open-type color reflective sheet according to an embodiment.

Referring to FIG. 5, a process of forming an open-type color reflective sheet includes operation 510 of preparing a support layer formed of a proper material, operation 520 of laminating a bonding layer on one surface, for example, a top surface of the support layer, operation 530 of selectively forming a first printed layer on one surface of the bonding layer, operation 540 of bonding a reflective layer onto the bonding layer or the first printed layer, operation 550 of selectively forming a second printed layer on one surface of the reflective layer, operation 560 of laminating a water-repellent coating layer on the reflective layer or the second printed layer, operation 570 of selectively applying an adhesive layer to another surface, for example, a bottom surface of the support layer, and operation 580 of attaching a release film layer onto one surface of the adhesive layer.

In operation 510, the support layer 110, 210, 310 of proper materials is prepared. The support layer 110, 210, 310 may be formed of transparent, semitransparent or opaque materials as materials to support the open-type color reflective sheet 100, 200, 300. Materials of the support layer 110, 210, 310 may include, for example, at least one of fiber, paper, leather, and a film manufactured from a synthetic resin or a quantum dot barrier. A thickness of the support layer 110, 210, 310 may be properly selected based on the materials.

In operation 520, the bonding layer 120, 220, 320 is laminated on one surface (for example, the top surface of the support layer 110, 210, 310 or a surface of a sheet on which light is incident). In the bonding layer 120, 220, 320, a binder resin, color pigments and/or fluorescent pigments are properly mixed, and a non-yellowing pigment, a non-yellowing polyurethane resin and nano-pearl particles may be desirably mixed. The bonding layer 120, 220, 320 includes various fluorescent pigments and/or various non-yellowing pigments, for example, a white pigment, a yellow pigment, a red pigment, a blue pigment, a green pigment, a purple pigment or a block pigment, instead of including a metallic paste that has been used in the related art, and thus it is possible to realize a variety of background colors. Also, using non-yellowing materials, it is possible to maximize visibility despite decoloration.

In addition, using the non-yellowing polyurethane resin and the binder resin mixed in the bonding layer 120, 220, 320, it is possible to prevent the plurality of bead-type reflectors 132, 232, 332 from being detached from the reflective layer 130, 230, 330. Using the nano-pearl particles, it is possible to increase a reflective efficiency of light. For example, the bonding layer 120, 220, 320 in which pigments and a binder resin are mixed to realize a variety of colors may be applied and laminated on one surface of the support layer 110, 210, 310 at a thickness of about 10 μm to 100 μm, a thickness of 20 μm to 80 μm, or a thickness of 30 μm to 70 μm.

In operation 530, the printed layer 240, as the first printed layer that is a lower printed layer, is selectively formed on one surface of the bonding layer 220, and characters and/or various patterns, for example, an all-over continuous pattern, are assigned to the open-type color reflective sheet. As described above, a variety of background colors may be realized on the open-type color reflective sheet due to pigments mixed in the boding layer 220, and a dynamic and 3D texture with two-layered colors may be represented by forming the printed layer 240. To form a pattern on the printed layer 240, curable ink, for example, one-component UV curable ink, may be used.

As described above, ink may include an adhesive base resin, a solvent, and an ink primer that includes a pigment, a wetting agent and a surfactant and that may selectively include an inorganic pigment. For example, a scheme of forming a pattern on the printed layer 240 may include performing printing using ink. In this example, the ink may be obtained by mixing a base resin and an ink primer that includes four primary colors, by obtaining a blend of the above mixture and a proper curing agent (for example, a UV curing agent) at a weight ratio of about "100:5" to "100:10," and by diluting the blend in a diluted solvent obtained by mixing toluene and methyl ethyl ketone (MEK) at a weight ratio of "4:6" to "6:4." The ink may be, for example, a mixture containing 60 to 70 parts by weight of the blend and 30 to 40 parts by weight of the diluted solvent.

Figure 6:
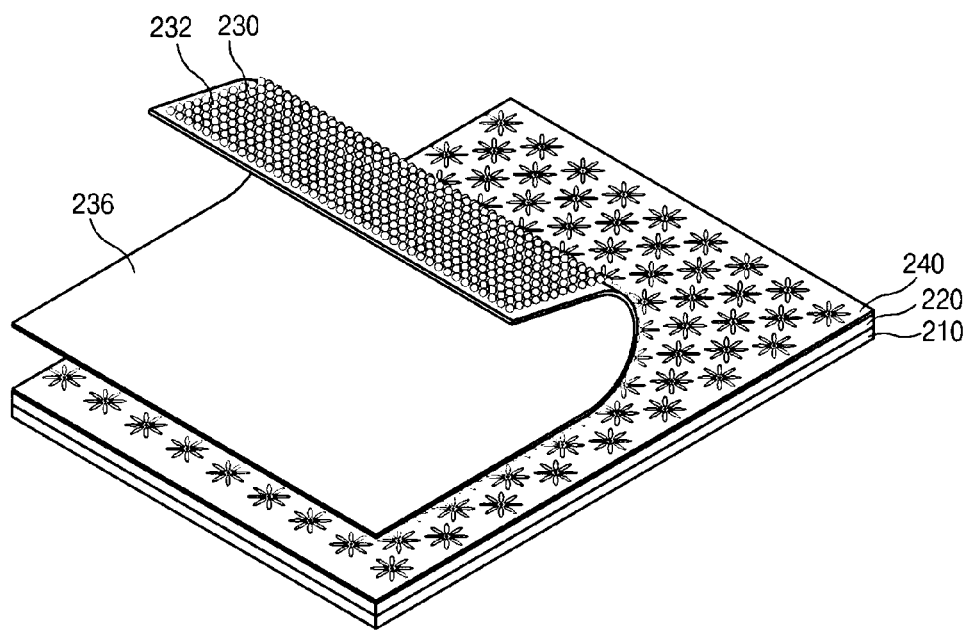
FIG. 6 is an explosive perspective view illustrating a process of bonding a reflective layer to one surface of a bonding layer in a state in which a printed layer is formed according to an embodiment.

Various patterns or images may be realized and represented on the printed layer 240 based on a variety of colors and patterns. A type of images or patterns to be realized on the printed layer 240 is not particularly limited, and characters, shapes, drawings, photographs or a combination thereof may be represented. FIG. 6 illustrates an example of the printed layer 240 representing a flower pattern as an all-over continuous pattern. For example, the printed layer 240 may have a thickness equal to or less than half the protrusion height H of the bead-type reflector 232. For coating and printing, the printed layer 240 selectively to formed on the one surface of the bonding layer 220 may have a thickness of 0.1 μm to 100 μm, a thickness of 0.5 μm to 10 μm, or a thickness of 0.5 μm to 3 μm. In an example, when a thickness of the printed layer 240 is less than the above ranges, it may be difficult to identify an image. In another example, when the thickness of the printed layer 240 exceeds the above ranges, it may be difficult to form a curved structure.

A scheme for forming the printed layer 240 on the one surface of the bonding layer 220 is not particularly limited, and various coating or printing methods may be used. For example, the printed layer 240 may be formed by UV offset printing, UV gravure printing, UV seal printing, digital actual image printing (for example, a solvent, water-based, or UV), or a method of sublimation or transfer of a printed image, however, there is no limitation thereto.

For example, when the printed layer 240 is formed on the one surface of the bonding layer 220, the reflective layer 230 laminated on the printed layer 240 may be stably fixed on a top surface of the printed layer 240 in which a pattern image is realized and the bonding layer 220 in which various pigments are mixed. Also, the bonding layer 220 and the printed layer 240 are sequentially formed on another surface, for example, a bottom surface of the reflective layer 230 and are realized with different colors, and thus it is possible to provide visually different textures.

In operation 540, the reflective layer 130, 230, 330 including the plurality of bead-type reflectors 132, 232, 332 is formed and bonded to another surface of the printed layer 240, 340 or the bonding layer 120, 220, 320 that is formed to realize a variety of background colors by mixing a binder resin, a pigment, a non-yellowing polyurethane resin and nano-pearl particles. As described above, the bead-type reflectors 132, 232, 332 may be embedded in the bonding layer 120, 220, 320 or the printed layer 240 so that a portion of each of the bead-type reflectors 132, 232, 332 may protrude by ⅓ to ⅔ of the diameter D from the bonding layer 120, 220, 320 or the printed layer 240, and thus it is possible to prevent the bead-type reflectors 132, 232, 332 from being detached from the bonding layer 120, 220, 320 or the printed layer 240 while maximizing the reflective brightness.

The diameter D of the bead-type reflectors 132, 232, 332 may range from about 1.0 μm to 2.0 mm, from 10 μm to 1.0 mm, from 20 μm to 50 μm, or from 28 μm to 40 μm; however, embodiments are not limited thereto. The reflective layer 130, 230, 330 may be formed using the same method as a method of forming a reflective layer including bead-type reflectors according to the related art.

For example, when the printed layer 240 is formed on one surface of the bonding layer 220 attached to one surface of the support layer 210, as shown in FIG. 6, a separating layer is formed by applying a resin with detachable adhesion onto a carrier film 236 or a proper thin film, such as a PET film, and the bead-type reflectors 232 are embedded in the separating layer by an appropriate depth. The reflective layer 230 including the bead-type reflectors 232 is attached to one surface of the printed layer 240, and the carrier film 236 and the separating layer are separated from the bead-type reflectors 232 through an aging process. Thus, the reflective layer 230 may be formed on one surface of the printed layer 240, as shown in FIG. 7B.

Figure 7A:
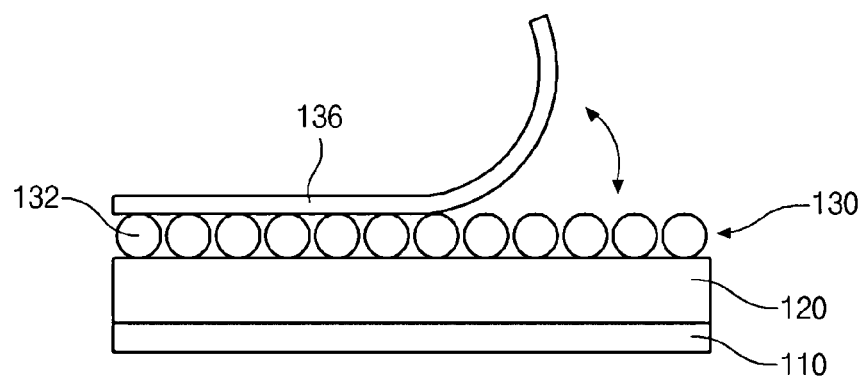
FIGS. 7A and 7B are cross-sectional views illustrating a state in which a film is peeled off from a plurality of glass beads embedded in a top surface of a bonding layer, and a state in which a film is peeled off from a plurality of glass beads embedded in a top surface of a printed layer, respectively, according to an embodiment.
Figure 7B:
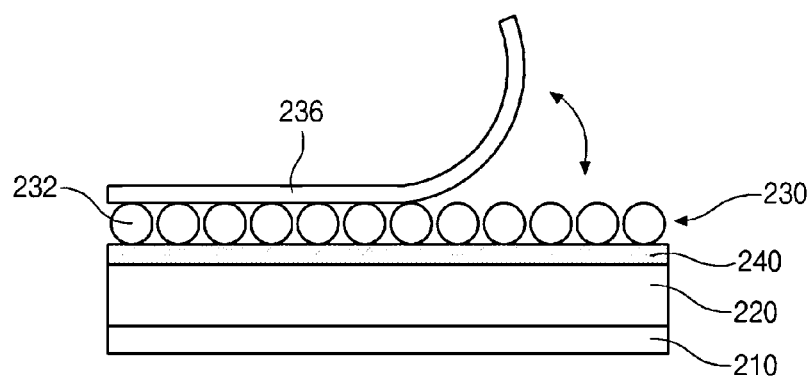

Also, when the reflective layer 130, 230 is bonded directly to one surface of the bonding layer 120, 220, a separating layer is formed by applying a resin onto a carrier film 136, 236, the bead-type reflectors 132, 232 are embedded in the separating layer by an appropriate depth, the reflective layer 130, 230 including the bead-type reflectors 132, 232 is attached to one surface of the bonding layer 120, 220, and the carrier film 136, 236 and the separating layer are separated from the bead-type reflectors 132, 232 through an aging process, as shown in FIGS. 7A and 7B.

For example, the bonding layer 120, 220 and the reflective layer 130, 230 may be in direct contact with each other to form a reflective film. In this example, a separating layer may be formed by applying an adhesive resin onto the carrier film 136, 236, and the bead-type reflectors 132, 232 are embedded in the separating layer. The bonding layer 120, 220 may be formed by applying a bonding agent in which various pigments, the binder resin and non-yellowing polyurethane resin may be mixed as described above, onto the bead-type reflectors 132, 232, and the carrier film 136, 236 and the separating layer may be separated from the bead-type reflectors 132, 232, as shown in FIG. 6A.

Figure 8:
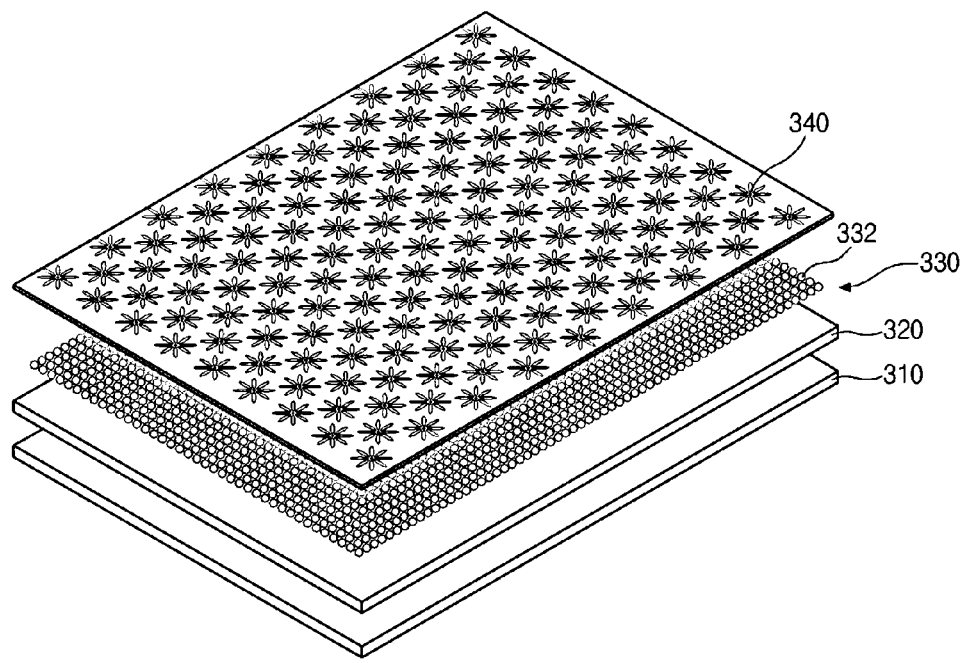
FIG. 8 is an explosive perspective view illustrating a process of forming a printed layer on a top surface of a reflective layer according to an embodiment.

In operation 550, the printed layer 340, as the second printed layer that is an upper printed layer, is selectively formed on a surface on which the reflective layer 130, 230, 330 is formed, as shown in FIG. 8. A scheme of forming the printed layer 340 is substantially the same as a scheme of forming the printed layer 240, and accordingly further description thereof is not repeated here. As a result of action and reaction of a variety of background colors realized in the bonding layer 120, 220, 320 and a pattern image formed on the printed layer 240, it is possible to represent a cubic effect and texture of colors of a pattern image formed on the printed layer 340.

The printed layer 340 may have a thickness equal to or less than half the protrusion height H of the bead-type reflector 332. For coating and printing, the printed layer 340 selectively formed on the one surface of the bonding layer 320 may have a thickness of 0.1 µm to 100 µm, a thickness of 0.5 µm to 10 µm, or a thickness of 0.5 µm to 3 µm. A scheme for forming the printed layer 340 on one surface of the bonding layer 320 is not particularly limited, and various coating or printing methods may be used.

In operation 560, the water-repellent coating layer 150, 250, 350 is laminated on the reflective layer 130, 230 or the printed layer 340. By forming the water-repellent coating layer 150, 250, 350, it is possible to prevent visibility, durability and reflective brightness from decreasing due to an external environmental factor, for example, a penetration of foreign substances or a water-based component, such as rainwater or moisture. The water-repellent coating layer 150, 250, 350 may be formed of, for example, a silica-based water-repellent coating agent. For example, polymer-silica ($SiO_2$), fluoridized nano-silica, a silicone-based one-component waterproof coating agent and a combination thereof. For example, coating and printing may be performed on the water-repellent coating layer 150, 250, 350 with a thickness of 0.1 µm to 100 µm, a thickness of 0.5 µm to 10 µm, or a thickness of 0.5 µm to 3 µm.

In operation 570, the adhesive layer 160, 260, 360 is applied onto another surface, for example, a bottom surface of the support layer 110, 210, 310 using an adhesive having a proper adhesion. An available adhesive may include, for example, a removable type adhesive, a permanent type adhesive or a hot-melt type adhesive. For example, the adhesive layer 160, 260, 360 may have a thickness of 1 µm to 100 µm, a thickness of 5 µm to 80 µm, or a thickness of 10 µm to 50 µm, and the thickness of the adhesive layer 160, 260, 360 is not particularly limited.

In operation 580, the release film layer 170, 270, 370 is detachably attached to one surface, for example, a bottom surface of the adhesive layer 160, 260, 360. When the open-type color reflective sheet 100, 200, 300 is attached to an adherend, a release layer coated with a silicone composition may be formed on one surface of the release film layer 170, 270, 370, because the release film layer 170, 270, 370 needs to be peeled off and removed from the adhesive layer 160, 260, 360 for attachment between the adhesive layer 160, 260, 360 and the adherend. The release film layer 170, 270, 370 may be formed of materials, for example, paper, synthetic resins and fiber, and a thickness of the release film layer 170, 270, 370 may be properly adjusted based on the materials.

The open-type color reflective sheet 100, 200, 300 may be attached to the adherend. Examples of the adherend may include, but are not particularly limited to, clothes, shoes and bags of a person working in a dangerous location, printed materials, road signs, a variety of advertisements, panels for advertising, and an object on a flat plate.

Also, the open-type color reflective sheet 100, 200, 300 may be attached to the adherend by, for example, adhesion or sewing, or by sewing an edge of the open-type color reflective sheet 100, 200, 300 to a surface of the adherend. For example, the open-type color reflective sheet 100, 200, 300 may be attached by thermal fusion bonding using a high frequency scheme or a high-temperature pressing scheme. The thermal fusion bonding may be performed using the adhesive layer 160, 260, 360 applied onto the bottom surface of the support layer 110, 210, 310.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An open-type color reflective sheet comprising:
   a support layer;
   a bonding layer laminated on one surface of the support layer, the bonding layer comprising a binder resin, a pigment and a non-yellowing polyurethane resin;
   a reflective layer comprising a plurality of bead-type reflectors embedded in the bonding layer; and
   a silicone-based water-repellent coating layer laminated on one surface of the reflective layer.

2. The open-type color reflective sheet of claim 1, further comprising a printed layer formed in at least one of a position between the bonding layer and the reflective layer or a position between the reflective layer and the silicone-based water-repellent coating layer.

3. The open-type color reflective sheet of claim 2, wherein the printed layer comprises a one-component ultraviolet (UV) ink containing an adhesive component.

4. The open-type color reflective sheet of claim 1, wherein the silicone-based water-repellent coating layer comprises a silicone-based water-repellent coating agent selected from the group consisting of polymer-silica ($SiO_2$), fluoridized nano-silica, a silicone-based one-component waterproof coating agent and a combination thereof.

5. The open-type color reflective sheet of claim 1, wherein the pigment included in the bonding layer comprises:
   at least one color pigment selected from the group consisting of a white pigment, a yellow pigment, a red pigment, a blue pigment, a green pigment, a purple pigment and a black pigment; and
   a fluorescent pigment.

6. The open-type color reflective sheet of claim 1, wherein the plurality of bead-type reflectors are embedded in the bonding layer so that a portion of each of the bead-type reflectors is exposed by ⅓ to ⅔ of a diameter of each of the bead-type reflectors on one surface of the bonding layer.

7. The open-type color reflective sheet of claim 1, wherein the support layer is formed of a material selected from the group consisting of fiber, paper, leather, and a film manufactured from a synthetic resin or a quantum dot barrier.

8. The open-type color reflective sheet of claim 1, further comprising:
a release film layer detachably attached to an adhesive layer bonded to another surface of the support layer.

9. A method of manufacturing an open-type color reflective sheet, the method comprising:
laminating a bonding layer on one surface of a prepared support layer, the bonding layer at least comprising a binder resin, a pigment and a non-yellowing polyurethane resin;
bonding a reflective layer to the bonding layer, the reflective layer comprising a plurality of bead-type reflectors; and
laminating a silicone-based water-repellent coating layer on one surface of the reflective layer.

10. The method of claim 9, further comprising:
forming a printed layer in at least one of a position between the bonding layer and the reflective layer or a position between the reflective layer and the silicone-based water-repellent coating layer.

11. The method of claim 10, wherein the printed layer is formed using a one-component ultraviolet (UV) ink containing an adhesive component.

12. The method of claim 9, wherein the silicone-based water-repellent coating layer comprises a silicone-based water-repellent coating agent selected from the group consisting of polymer-silica ($SiO_2$), fluoridized nano-silica, a silicone-based one-component waterproof coating agent and a combination thereof.

13. The method of claim 9, wherein the bonding of the reflective layer to the bonding layer comprises embedding the plurality of bead-type reflectors in the bonding layer so that a portion of each of the bead-type reflectors is exposed by ⅓ to ⅔ of a diameter of each of the bead-type reflectors on one surface of the bonding layer.

14. The method of claim 9, wherein the support layer is formed of a material selected from the group consisting of fiber, paper, leather, and a film manufactured from a synthetic resin or a quantum dot barrier.

* * * * *